United States Patent Office 2,868,044
Patented Jan. 13, 1959

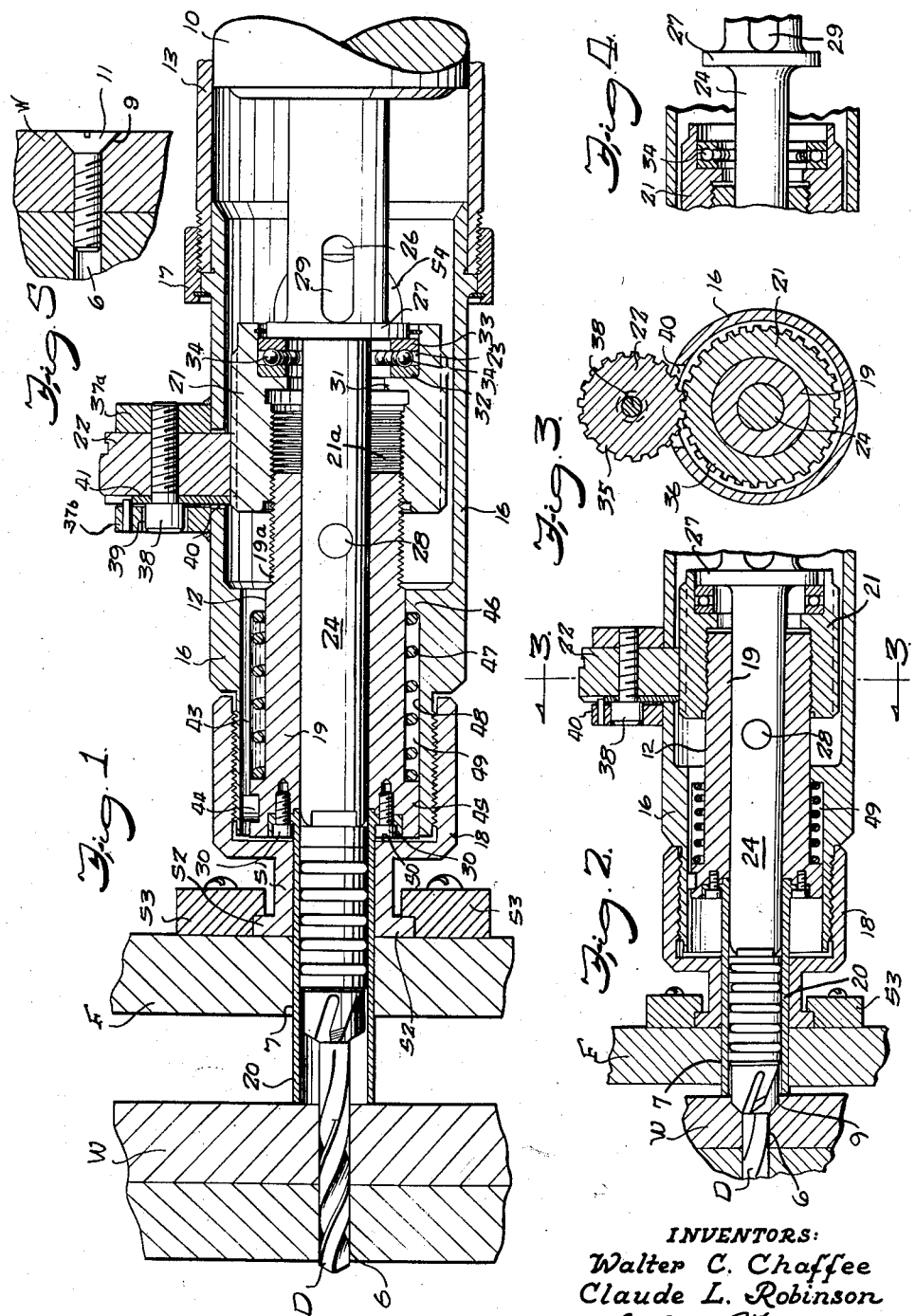

2,868,044

CUTTING DEPTH CONTROL DEVICE

Walter C. Chaffee and Claude L. Robinson, Spring Lake, Mich., assignors to Gardner-Denver Company, Quincy, Ill., a corporation of Delaware Application March 3, 1955, Serial No. 491,844

7 Claims. (Cl. 77—55)

This invention relates to power operated tools and more particularly to improved means for controlling the depth of penetration of cutting elements used with such tools.

In the aircraft industry, particularly, it has become desirable to fasten together parts of the fuselage, wings, and other componetns by means of bolts recessed into the parts. For aerodynamic reasons, it is essential that the surface of the plane be completely smooth and that the bolts used be absolutely flush with the surface into which they are inserted. For this reason, extreme accuracy is required in the construction of the component parts of the aircraft. If the surfaces are to be smooth, the bolts must necessarily be accurately countersunk so as to neither project beyond the surface nor leave a recess. All of the bolts to be used in the construction are not of the same size. Therefore, it is desirable to have a tool capable of accurately countersinking a large number of sizes of bolts without requiring complete disassembly and resetting of the tool between each operation in order to accommodate various desired depths of cutting and countersinking. Because of the large number of holes drilled it is usually essential that a fixture be uesd to accurately locate these holes in the work. Therefore the drilling tool also must be capable of use with a fixture. It will be noted that our invention is particularly useful in this environment and is adapted to satisfy these requirements.

The primary object of this invention, therefore, is to provide a power tool accessory for attachment to a reciprocatory power-operated tool embodying a stop mechanism which permits of extremely accurate adjustment and without necessity for dismantling the tool or the device, so as to control the depth of penetration of a cutting element carried by the tool. A related object is to provide an attachment which will accurately control the depth of cutting and when the tool is used with a fixture will operate independently of the distance between the fixture and the workpiece.

Another object is to provide a cutting depth control device which permits a large selection of accurate settings of the tool whereby a plurality of choices may be had as to depth of penetration.

It is still another object to provide a means for accomplishing the change in setting quickly without removing the cutting unit from its chuck.

It is a further object to provide a penetration depth control mechanism which is adaptable for use in drilling, boring, countersinking and any similar rotary cutting operations.

Still another object is to provide a cutting depth control mechanism which may be used with cutting bits of variable types, sizes and lengths and for cutting workpieces at various distances from the tool.

A further object is to provide a cutting depth control mechanism for a combination drill and countersink whereby holes may be countersunk exactly to the required depth in order to provide a smooth surface when bolts or other fastening elements are inserted in the workpiece.

The objects of the invention thus generally stated together with other objects and ancillary advantages are attained by the construction and arrangement set forth by way of illustration and not of limitation in the accompanying drawings, in which:

Figure 1 is a longitudinal section of a cutting depth control device embodying the features of the present invention with a component setting providing a minimum depth cut as used with a fixture at a maximum distance from the workpiece.

Fig. 2 is a longitudinal section similar to Fig. 1, but on a somewhat reduced scale, of the illustrative depth-control device with a component relationship providing a maximum depth cut as used with a fixture at a minimum distance from the workpiece.

Fig. 3 is a fragmentary transverse sectional view of the adjusting mechanism of the instant device taken substantially in the plane of line 3—3 of Fig. 2.

Fig. 4 is a fragmentary elevational view illustrating the spaced relation of the thrust bearing and drive spindle components prior to the attainment of the full depth during cutting operation.

Fig. 5 is a fragmentary sectional view of a workpiece having a drilled and countersunk hole therein with an inserted bolt.

Shown in Fig. 1 is a workpiece W in which it is desired to form a hole 6 as by a cutting tool, such as a drill D, the location of which is to be as predetermined by a hole 7 in a fixture F whch is spaced from the workpiece. Fig. 2 shows the same workpiece and hole 6 at the end of the drilling operation and with the hole countersunk to a predetermined depth as at 9. Fig. 5 shows the completed hole 6 and countersunk portion 9, having a bolt 11 located in place flush with the surface of the workpiece W.

The illustrative device is intended for use with any reciprocatory power-operated tool as is fragmentarily indicated at 10. For a full description of such a tool reference is made to Patent No. 2,674,098 to John L. Taylor. The power tool disclosed therein is a pressure fluid operated tool of the type embodying a rotary spindle which is reciprocated toward and from the work and which is adapted to mount a cutting element to perform drilling, tapping or allied machining operations. Such tools are of the type especially adapted for detachable connection with a jig plate or the like associated with the work as particularly used, for example, in the aircraft industry where it is necessary to drill a large number of holes of various sizes and depths with extreme accuracy.

In general, the cutting depth control device, as shown in Figs. 1 and 2, includes a housing 16 in the form of a cylinder adaptable for attachment to the power tool housing 13 by means of a collar 17. A tool supporting bushing 18 is secured to housing 16 in order to support the tool and accessory during use. The housing 16 has located reciprocably therein an adjustable length spindle tube assembly shown generally at 12. A gauging tip or extension 20 of this assembly projects out of the outer end of the housing 16 through the fixture F and bushing 18 to engage the workpiece W. A spindle 24 is rotatably and reciprocably mounted in the spindle tube assembly 12 and is adapted at one end to receive the cutting tool D and at the other end to be secured to the power spindle 26 of the tool 10. The cutting tool D passes through the gauging tip 20 for engaging the workpiece. In order to provide a means for limiting the distance of travel of the cutting tool D, a collar 27 is provided on the spindle 24 adjacent its inner end. This collar 27 is arranged to cooperate with the thrust bearing 23 provided at the end of a stop gear 21.

A Morse taper is provided in each end of the spindle 24 so that the spindle may be attached to the power spindle 26 at one end and to receive the cutting tool D at the other end. Openings 28 and 29 are provided in the spindle 24 for purposes of access so as to permit reception of a drift pin or the like (not shown) to release the spindle and the cutting tool. Similarly, a large opening 54 is provided in the housing 16 through which the drift pin or other suitable device can be inserted to release the spindle 24 from the power tool 10 for removal of the accessory therefrom.

The spindle tube 19 reciprocably and rotatably supports the spindle 24 and is adjustable in length to provide a variable stop so that the depth of cut of the cutting tool may be controlled at the will of the operator. Preferably the spindle tube assembly 12 is formed in three parts with the spindle tube 19 having the removable gauging tip 20 fastened to the outer end thereof by means of machine screws 30. It will be apparent that the reach capacity of this accessory may be increased by replacing the spindle 24 and the gauging tip 20 with similar parts of greater length.

In order to provide an accurate adjustment of the length of the spindle tube 19 for controlling the depth of cut, without disassembling the accessory, the stop gear 21 is threaded upon the inner end of spindle tube 19 for rotation relative thereto. This stop gear 21 preferably is internally threaded as at 21a to cooperate with external threads 19a on the inner end of the spindle tube 19 and has an internal annular seat 31 for limiting the travel of stop gear 21 with respect to the spindle tube. In addition, the seat 31 provides a support for the thrust bearing 23 mounted in the stop gear 21. The thrust bearing 23 may be of the usual type comprising an inner race 32, an outer race 33, and antifriction bearing elements 34.

From the foregoing it will be seen that by rotation of the stop gear 21 with respect to the screw-threaded spindle tube 19, the effective length of the spindle tube assembly 12, determined from the outer end of the gauging tip 20 engaging the workpiece W to the surface of the outer race 33, can be readily adjusted.

In order to provide for external adjustment of the stop gear 21, a thumb-operated adjusting gear 22 is provided which has teeth 35 meshing with teeth 36 formed in the periphery of stop gear 21. As shown, the adjusting gear 22 is freely rotatable on a screw 38 which extends longitudinally of the device between lugs 37a and 37b which are rigid with the housing 16.

The adjusting gear 22 extends through an opening 40 in the housing 16 for toothed engagement with the stop gear 21 as shown in Fig. 3.

The adjusting gear may be rotated in either direction depending upon whether it is desired to increase or decrease the effective length of the spindle tube assembly 12. It will be apparent that any desired tooth ratio between those of the two gears 21 and 22 can be employed so as to provide an accurate measure of axial adjustment of the limiting position of the stop gear for engagement by the spindle collar 27 and thus of the depth of cut of the cutting tool D. In order to hold the adjusting gear in any particular position of adjustment, the screw 38 threadably engages the lug 37a, its head being free to rotate in a hole 39 in the opposite lug 37b, and a washer 41 is provided which, when pressed against the gear 22 by the set screw 38, holds the adjusting gear stationary and thereby prevents rotation of the stop gear 21 with respect to the spindle tube 19. To adjust the stop gear 21, it is only necessary for the operator to loosen the screw 38 and manually rotate the adjusting gear 22 for the desired increment.

A longitudinal keyway 43 is provided on the inside wall of housing 16 to cooperate with key 44 on spindle tube 19 in order to prevent rotation of spindle tube 19 with respect to housing 16, and yet permit reciprocal movement of spindle tube 19 therein. An annular projection 45 on the spindle tube 19 is slidably engaged with wall 48 of housing 16 and provides support for the spindle tube 19 as it reciprocates within the housing 16. An annular projection 46 extending inwardly from the housing wall in spaced relation to the annular projection 45 on the spindle provides a second point of support for the spindle tube 19. An annular space 49 is thus formed between the spindle tube 19 and the inner wall of the housing 16. A coil spring 47 is located in the annular space 49 and is compressed between the annular projections 46, 45, respectively, on the housing and spindle tube to provide a biasing force urging the spindle tube 19 in a direction toward the outer end of the housing 16.

The tool supporting bushing 18 is threadably engaged with the outer end of the housing 16 and has an inwardly projecting annular collar 50 which prevents the spring 47 from forcing the spindle tube 19 completely out of the housing 16. A projecting tubular portion 51 of the tool supporting bushing 18 has internal dimensions of sufficient size to permit the gauging tip 20 to pass therethrough. Outwardly extending flanges 52 are provided at the outer end of the tubular portion 51 adapted to be engaged by anchoring members 53 mounted on the fixture F. This construction permits the tool to be readily attached to and to be supported by the fixture during cutting operations.

The internal diameter of the tubular portion 51 of the tool supporting bushing 18 may be chosen according to the diameter of the gauging tip 20, the latter dimension being a function of the cutting tool diameter. Such a provision permits the use of this tool with a large number of sizes of cutting tools. It is readily seen that the bushing 18 and gauging tip 20 may be easily changed by simply removing the bushing from the housing 16, substituting a different gauging tip for the one held to the outer end of the spindle tube by the screws 30. A tool supporting bushing of the proper size to cooperate with the replaced gauging tip is then placed on the housing.

It will be easily understood by anyone skilled in the art that the herein described device is adaptable to numerous different modes of use. There are situations where the workpiece and the jig or fixture are in a fixed relationship, and it is necessary to accomplish a number of different operations on the workpiece.

In the operation of this device, with the position of the workpiece W being fixed, in close proximity, for example, to the position of the fixture F, the operator merely inserts the gauging tip 20 through the hole 7 in the fixture F and engages the flanges 52 of the tool supporting bushing 18 between the anchoring members 53 on the fixture. This supports the entire tool and it is not necessary that the tool be held by the operator during the cutting operations. When the gauging tip is inserted through the hole 7 in the fixture F, the end of the gauging tip engages the workpiece W and, as the distance between the workpiece and fixture is slight, the entire spindle tube assembly 12 is forced into the housing 16 thereby compressing the spring 47. When the housing 16 is securely fastened to the fixture, the spring 47 holds the spindle tube assembly 12 securely in engagement with the workpiece.

Alternatively, many situations arise where it is desirable to have the cutting tool and jig or fixture in a fixed relationship so that the workpiece may be readily moved into the desired position for performing the required operations thereon, and then be removed so that the same operation may be performed on a succeeding workpiece. When the tool device is to be used in such manner, it is only necessary for the operator to insert the gauging tip 20 through the hole 7 in the fixture and engage the flanges 52 of the tool supporting bushing 18 between the anchoring members 53. The tool is thus supported upon the fixture in the desired location, and it is only necessary to move the workpiece into engagement with the gauging tip at the desired position. It will be readily appreciated that when the workpiece engages the gauging tip, the spring 47 in the housing 16 can be compressed resulting in a relative movement between the gauging tip and the fixture thereby making the operation of the cutting depth control described herein independent of the distance between the workpiece and the fixture.

In the initial position of the tool prior to the commencement of the cutting operation as shown in Fig. 4, the cutting tool D, a drill and countersink cutter for example, has not started to cut into the workpiece W, and the stop collar 27 on the spindle 24 is spaced from the thrust bearing 23 on the stop gear 21. The power may be then applied to the spindle 24 from the power tool 10 by power spindle 26. The hole is then drilled and countersunk to the desired depth as controlled by the stop collar 27 and thrust bearing 23 which engage at the previously determined position of the latter. If at any time before or during this operation it is desired to change the depth of cut, it is merely necessary for the operator to loosen screw 38 and turn the adjusting gear 22 the desired amount thereby adjusting the stop gear 21 with respect to the spindle tube. When the desired position is obtained the screw 38 is tightened thereby fixing the positions of the gears and fixing the length of the spindle tube assembly with respect to the surface of the workpiece. After the cutting operations are completed, the removal of the tool or workpiece permits the restoration of the gauging tip to its fully extended position and the tool is ready for subsequent operations.

In Fig. 1 there is illustrated the use of this tool with a fixture spaced apart from the workpiece at a maximum distance and with the accessory adjusted to provide a minimum cut without countersinking. Fig. 2, on the other hand, shows the use of this tool with a fixture spaced from the workpiece at a minimum distance and with the accessory set for a maximum cut, that is, for example, a cut sufficient to provide the desired depth of countersinking. It will be obvious from the discussion herein that it is possible to adjust the tool for any distance between the fixture and the workpiece and also to provide for any desired depth of cut, the only changes required being those of the gauging tip 20 and the adjusting gear 22 for setting the position of the stop gear 21 with respect to the spindle tube 19.

It will appear that this device can be used with a number of different tools in which it is desired to limit or control the depth of cut in a workpiece and the invention should not be limited to the embodiment specifically described herein.

We claim as our invention:

1. A cutting depth control device for use with a tool having a rotary shaft which is reciprocated to move a cutting element to and from a workpiece, said device comprising, in combination, a housing attachable to the tool such that it is held against rotation, a spindle adapted for connection to the rotary shaft and adapted to carry the cutting element, a first stop rigid with said spindle, means journaling said spindle and longitudinally movable with respect to said housing, said means being engageable with the workpiece, a second stop mounted on said means and longitudinally adjustable with respect thereto for engagement by said first stop to limit penetration of the cutting element into the workpiece, and an adjusting element mounted on said housing and operably connected to said second stop for manually longitudinally adjusting the same.

2. In a cutting tool or the like, the combination comprising a housing adapted for non-rotatable mounting opposite a workpiece, a central tool spindle journaled in said housing and further mounted for endwise movement therein, means on said spindle for mounting a tool bit, a gauging member arranged in said housing for axial sliding movement and having a gauging tip extending parallel to the tool bit, means for biasing the gauging member to press the tip thereof against the workpiece, a threaded collar on said gauging member, stop means on said spindle for engaging the collar on said gauging member thereby to limit the outward movement of the spindle, and an adjusting element mounted on said housing and connected to said collar for manually rotating the collar.

3. In a cutting tool or the like, the combination comprising a housing adapted for mounting opposite a workpiece such that it is held stationary, a central tool spindle journaled in said housing and mounted for endwise movement therein, means on said spindle for mounting a tool bit, a gauging member arranged in said housing for axial sliding movement and having a gauging tip extending from the housing parallel to the tool bit, means for biasing the gauging member to press the tip thereof against the workpiece, said spindle having a shoulder for engaging the end of the gauging member and thereby determining the limit of outward movement of the spindle, and means accessible from outside the housing for manually adjusting the effective length of said gauging member.

4. A cutting depth control device for use with a power tool having a rotary shaft which is reciprocated to feed and return a cutting element with respect to a workpiece, said device comprising, in combination, a housing attachable at one end to the power tool, an adjustable stop means reciprocable within the housing, means in the housing resiliently biasing the stop means toward the forward end of the housing, said adjustable stop means including a rotatable collar and a gauging member having a hollow gauging tip extending from the housing, the effective length of said gauging member being adjusted by rotating said collar, a rotary spindle for mounting the cutting element so that it extends through the hollow gauging tip, said rotary spindle being adapted for non-rotative connection to the shaft of the power tool, and stop means fixed to said spindle for engaging said adjustable stop means to limit the movement of the cutting element into the workpiece.

5. In a cutting depth control device for use with a power tool having a housing and a rotary shaft for mounting a cutting element which is reciprocated to and from a workpiece from a position determined by a guide fixture, the combination comprising a housing, means on said housing for attachment at one end to the power tool housing and at the other end to said fixture so as to position and support the power tool with respect to the fixture, a rotary spindle reciprocable in the second named housing and adapted to be fixed to said rotary shaft, a first stop rigid with the rotary spindle, gauging means for determining the depth of penetration of the cutting element into the workpiece independently of the spacing between the workpiece and the fixture, means mounting said gauging means in the second named housing for longitudinal movement, said gauging means having fixed thereto a hollow gauging tip extending outwardly from the second named housing through the fixture so as to engage the workpiece, said spindle carrying the cutting element for reciprocation through the gauging tip, and means rigid with the gauging tip for engagement by said first stop to limit penetration of the cutting element into the workpiece.

6. In a cutting depth control device for use with a power tool having a housing and a rotary shaft for mounting a cutting element which is reciprocated to and from a workpiece from a position determined by a guide fixture, the combination comprising a housing, means on said housing for attachment at one end to the power tool housing and at the other end to the fixture so as to position and support the power tool with respect to the fixture, a rotary spindle reciprocable in the second named housing and adapted to be fixed to said rotary shaft, a first stop rigid with the rotary spindle, gauging means for determining the depth of penetration of the cutting element into the workpiece independently of the spacing between the workpiece and the fixture, means mounting said gauging means in the second named housing for longitudinal movement, said gauging means having a hollow gauging tip extending from the second named housing through the fixture so as to engage the workpiece, said spindle carrying the cutting element for reciprocation through the gauging tip, a second stop mounted rigid with the gauging tip so as to be engageable by the first stop to limit travel of the cutting element, and means for adjusting the second stop so as to vary the effective distance of the second stop from the end of the gauging tip thereby to vary the limit of travel of the cutting element.

7. A cutting depth control device for use with a power tool having a housing and a rotary shaft which is reciprocated to feed and return a cutting element with respect to a workpiece, said device comprising, in combination, a housing attachable at its rear end to the power tool housing; a hollow gauging tip within and projecting from the forward end of the second named housing; a hollow spindle tube reciprocably and non-rotatably mounted in the second named housing; the hollow gauging tip being secured at its inner end to said spindle tube so that the gauging tip and spindle tube are reciprocable together; a spring within the second named housing and acting on the spindle tube to tend to project the gauging tip outwardly from the second named housing; a rotary spindle reciprocable within the hollow spindle tube and adapted to mount the cutting element so that the cutting element extends through the gauging tip; said spindle being adapted to be secured to said power tool shaft; stop means fixed to said spindle near the connection of said spindle to said rotary shaft; another stop means adjustably connected to said spindle tube and adapted to be contacted by the first mentioned stop means to limit straight line movement of said spindle in one direction, said other stop means when adjusted varying the distance between itself and the outer end of the gauging tip; and means mounted on the second named housing and manually operable from the exterior of the second named housing to adjust said other stop means on said spindle tube.

References Cited in the file of this patent

UNITED STATES PATENTS

| | | |
|---|---|---|
| 1,530,593 | Calkins | Mar. 24, 1925 |
| 2,296,087 | Burns | Sept. 15, 1942 |
| 2,461,716 | Blatt | Feb. 15, 1949 |
| 2,740,330 | Watson | Apr. 3, 1956 |